T. W. WELSH.
Improvement in Relief Valves for Air Brake Cylinder.

No. 125,639.  Patented April 9, 1872.

WITNESSES.
M. Gardner.

INVENTOR.
Thomas W. Welsh,
by Bakewell, Christy & Kerr,
his Att'ys.

125,639

UNITED STATES PATENT OFFICE.

THOMAS W. WELSH, OF PITTSBURG, PENNSYLVANIA, ASSIGNOR TO RALPH BAGALEY, OF SAME PLACE.

IMPROVEMENT IN RELIEF-VALVES FOR AIR-BRAKE CYLINDERS.

Specification forming part of Letters Patent No. 125,639, dated April 9, 1872.

SPECIFICATION.

*To all whom it may concern:*

Be it known that I, THOMAS W. WELSH, of Pittsburg, in the county of Allegheny and State of Pennsylvania, have invented a new and useful Improvement in Relief-Valves for Air-Brake Cylinders; and I do hereby declare the following to be a full, clear, and exact description thereof, reference being had to the accompanying drawing making a part of this specification, in which—

Figure 1:
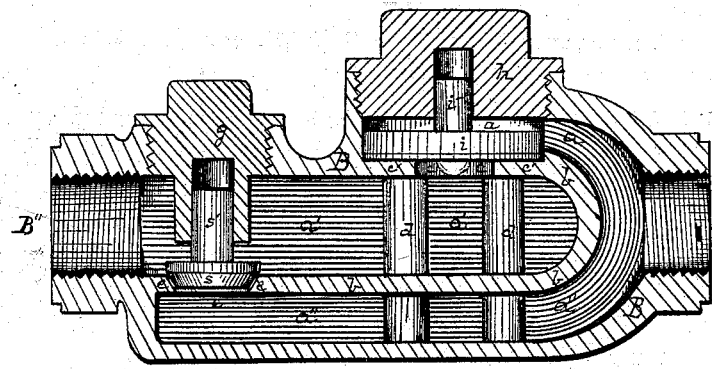
Figure 2:
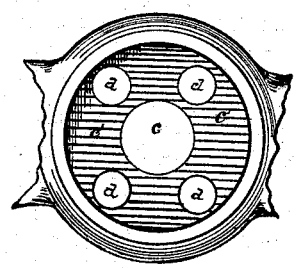

Figure 1 is a longitudinal vertical section illustrative of my improvement, and Fig. 2 is a plan or top view of one of the valve-seats.

Like letters of reference indicate like parts of each.

My improvement is designed as a relief-valve for and to be used in connection with the brake-cylinders of atmospheric and steam brakes. Such brake-cylinders—one to each car—are ordinarily operated by steam or by compressed air from a main reservoir on the locomotive. The compressed air is conducted back through the train by a pipe, from which a branch pipe leads to each brake-cylinder, so as to admit the compressed air to one side of a movable piston, the action of which applies the brakes. To let off the brakes, the air must of course be allowed to escape. By my improvement I provide for each brake-cylinder an unobstructed passage for the inflow of air into the brake-cylinder, and an automatically-operating escape for the outflow of the compressed air when the brakes are to be let off.

To enable others skilled in the art to make and use my improvement, I will proceed to describe its construction and mode of operation.

The valve-case B is arranged in the line of pipe leading from the air-reservoir to the brake-cylinder, and preferably in the branch pipe above referred to. The connection with the pipe from the air-reservoir is made at the end B', and the pipe-connection to the brake-cylinder is made at the end B''. The valve-case has a U-shaped diaphragm, $b$, which divides the inside space into three chambers, $a\ a'\ a''$. The chambers $a\ a'$ are connected by an air-port, $c$, surrounded by a disk-shaped valve-seat, $c'$, and the chambers $a'\ a''$ are connected by an air-port, $e$. From the chamber $a$ a series of open pipes, $d\ d$, lead down through the valve-case and open into the open air. The upper open ends of these pipes $d\ d$, and also the port $c$, are open and closed by a valve, $i$, which plays up and down, being guided by its stem $i'$ in the cavity of the nut $h$. The other port $e$ is opened and closed in like manner by a check-valve, $s$, of the ordinary construction, which is guided in the well-known way by its stem $s'$ working in the cavity of the nut $g$.

When the brakes are to be applied, the air is turned on so as to enter at the end B'. It then enters the chamber $a$, seats the valve $i$ so as to close the escape-pipes $d$, passes along the lower chamber $a''$, lifts the valve $s$, passes out at the end B'', and on into the brake-cylinder where it does its work. To let off the brakes, the compressed air is first allowed to escape from the brake-pipes at some point outside of the end B'. The compressed air in the brake-cylinder pressing backward, then seats the valve $s$, passes along the chamber $a'$, lifts the valve $i$, passes up through the port $c$, and thence downward and outward through the pipes $d\ d$, and so escapes. The piston in the brake-cylinder is then free to come back and the brakes are off.

This apparatus is automatic in its operation, can be cheaply made, and is free from liability to get out of order. The face of the valve $i$ or its seat $c'$ can be packed in the usual way, if desired.

The manner of its use and operation in connection with steam-brakes will be readily understood by those skilled in the art.

What I claim as my invention, and desire to secure by Letters Patent, is—

1. A valve-case, B, divided by a diaphragm into three chambers, $a\ a'\ a''$, with communicating ports $e\ c$, substantially as described.

2. The combination, in a single valve-case, B, of a U-shaped diaphragm, $b$, and pair of independently-acting valves $e\ s$, arranged relatively to each other and to the direction of air pressure, substantially as described.

3. The central exhaust-chamber $a'$, with a port or ports leading to and in combination with the escape-pipes $d\ d$, substantially as and for the purposes set forth.

4. The combination of the chambers $a\ a'\ a''$, ports $c\ e$, valves $i\ s$, and pipes $d$, substantially as described.

In testimony whereof I, the said THOMAS W. WELSH, have hereunto set my hand.

THOS. W. WELSH.

Witnesses:
A. C. SPAULDING,
GEO. I. WHITNEY.